Nov. 25, 1924.  1,516,637
E. P. HOOVER
THROTTLE LEVER
Filed March 15, 1924
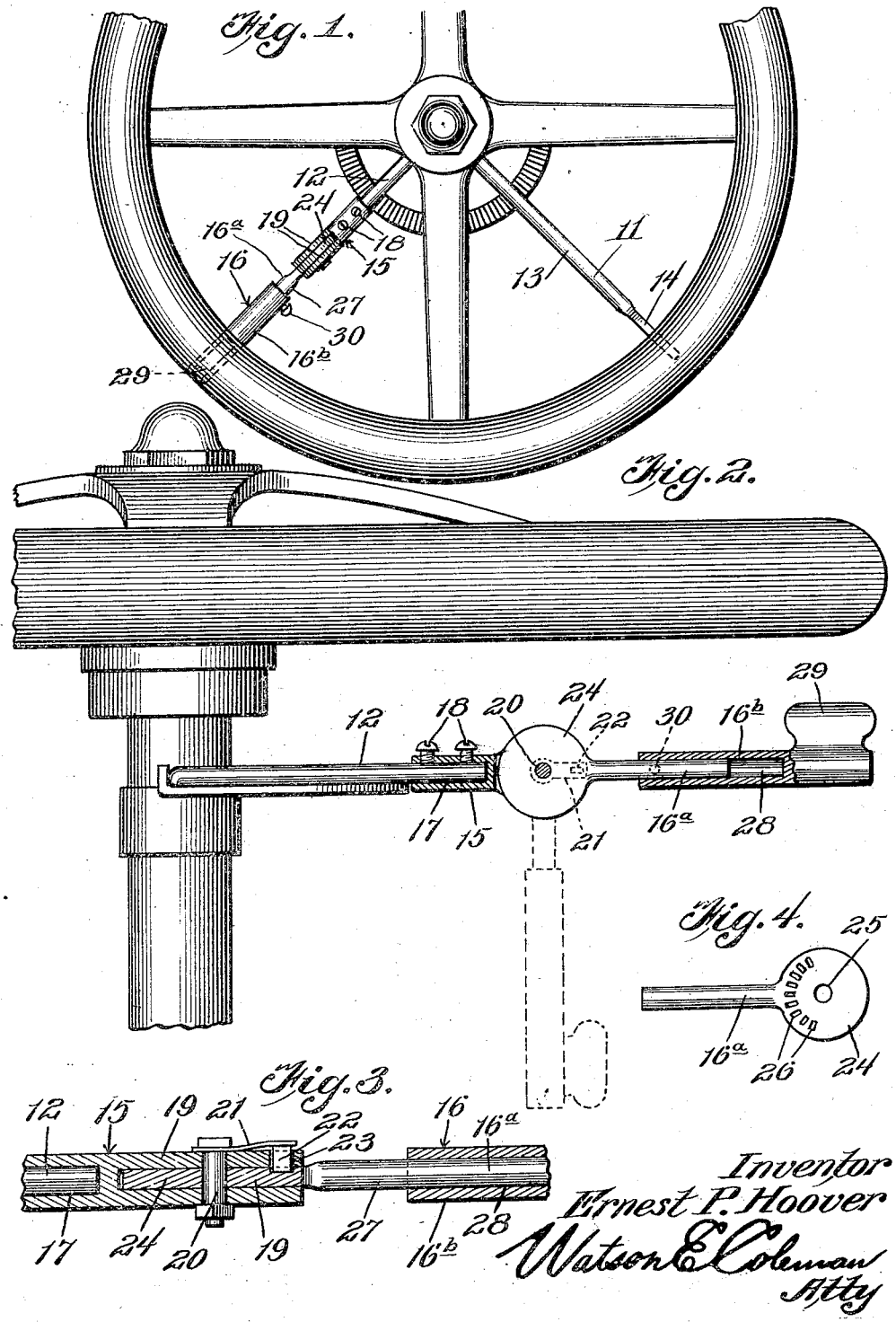

Patented Nov. 25, 1924.

1,516,637

UNITED STATES PATENT OFFICE.

ERNEST P. HOOVER, OF WILTON JUNCTION, IOWA.

THROTTLE LEVER.

Application filed March 15, 1924. Serial No. 699,483.

*To all whom it may concern:*

Be it known that I, ERNEST P. HOOVER, a citizen of the United States, residing at Wilton Junction, in the county of Muscatine and State of Iowa, have invented certain new and useful Improvements in Throttle Levers, of which the following is a specification, reference being had to the accompanying drawings.

This invention relates to handles for throttle levers controlling the throttles of the internal combustion engines of vehicles and more particularly to the construction of that type of throttle lever operating adjacent to and above or below the periphery of the steering wheel of the vehicle.

An important object of the invention is to provide in a handle of this type a construction whereby the handle may be readily adjusted to regulate the distance between the same and the adjacent portion of the steering wheel, so that compensation may be made for varying thickness of the hands of different operators manipulating the steering wheel and throttle rod or for variation in the effective thickness of the hand of an operator as when he is driving with and without gloves. At present there are a number of such handles extending into proximity with the steering wheel so that they may be readily manipulated without removing the hands from the steering wheel, but in these handles no provision of this sort is made with the result that very often when the operator is wearing gloves and in moving the steering wheel the throttle rod is also moved resulting in a sudden increase or decrease of the speed of the vehicle which is undesirable. These extension levers have the further disadvantage in that they project outwardly so closely to the perimeter of the wheel that they are often contacted by the driver in seating himself in the car and the engine suddenly accelerated or caused to raise or completely cut off making it necessary that the driver, if the car be of the type started by a hand crank, again leave his seat to start the car.

Accordingly, a further object of this invention is to so construct the lever that the operating end portion thereof may be thrown completely out of the way at such times and also at times when the operation of the throttle is not necessary so that accidental operation thereof is impossible.

These and other objects I attain by the construction shown in the accompanying drawings, wherein for the purpose of illustration is shown a preferred embodiment of my invention and wherein:—

Figure 1 is a fragmentary plan view of an automobile steering wheel with the associated control levers, one of these levers being shown as having applied thereto an extension constructed in accordance with my invention;

Figure 2 is a side elevation of the wheel and lever, the extension being shown in section;

Figure 3 is an enlarged detail sectional view taken through the extension;

Figure 4 is a side elevation showing the construction of the hub portion of the outer section of the extension.

Referring now more particularly to the drawings, the numeral 10 indicates the steering wheel of a vehicle, 11 and 12 the spark and throttle control respectively. For the purposes of disclosure I have shown the throttle control lever 12 having an attachment thereto altering the construction of the vehicle in accordance with my invention, while the spark control lever 11 has been illustrated without this attachment and to show the usual construction of this lever before its alteration. It will, of course, be understood that if so desired the modification can be applied to both levers instead of one as disclosed. These levers in the usual construction thereof are formed of a round bar 13 the extremity 14 of which is vertically flattened and widened to provide a finger grip.

In accordance with my invention I remove this flattened end 14 and apply to the round rod an extension consisting of two pivotally connected parts 15 and 16, the part 16 being adjustable as to length as will hereinafter more fully appear. The part 15 is provided in its end with a socket 17 receiving the end of the rod 13 and the walls of this socket at spaced intervals are provided with set screws 18 combining upon the rod to secure the section 15 thereto. The end of the section is provided with spaced vertically extending plates 19 integrally formed therewith and substantially circular in form, a pivot 20 extending through the plates as indicated. This pivot has a head securing to the outer surface of one of the plates a spring 21 to the end of which is applied a lug 22 operating through an opening 23 formed in the adjacent plate.

The section 16 is formed in two sections 16$^a$ and 16$^b$, one end of the section 16$^a$ being provided with a flat disk-like enlargement 24 having a central opening 25 for the reception of the pivot 20. The face of this plate opposing that plate 19 through which the lug 22 extends is provided with a plurality of circumferentially spaced lug receiving depressions 26, the depression and lug coacting in such manner that the lever section 16$^a$ may be moved to a desired angle with relation to the section 15 and will be yieldingly held in this position, the grip of the lug in the depression being sufficient to prevent downward movement of the section 16 of the lever under vibration of the vehicle while in movement. The remainder of the section 16$^a$ is in the form of a bar 27 received in a tubular socket 28 formed upon an operating handle 29, this handle being preferably arranged at an angle to the socket and extending upwardly toward the rim of the steering wheel 10 for engagement by the fingers.

In the use of the device it will be obvious that the end portion 16 of the lever may be adjusted so that the edge of the handle portion next adjacent the steering wheel rim is properly spaced to prevent disengagement thereof by the hand while operating the steering wheel regardless of the size of the hand engaging the steering wheel. When the operator is entering or leaving the car with the engine running or to start the engine, the end portion 16 may be moved downwardly so that it is vertically disposed and completely out of the way so that it will not be engaged by the personal clothing of the operator in this movement. Many serious accidents have been caused by improper positioning of the operating levers 11 or 12 through accidental engagement thereof. When the car is to be operated for a long period with the throttle lever in an engaged position, the handle end of the lever may be moved to this vertical position thus assuring against accidental operation thereof even though the hands be removed from the steering wheel. The length of the handle section 16 can be regulated by adjusting the socket 28 upon the bar section 27 thereof, a clamping set screw 30 being provided to hold this socket in adjusted position. It will thus be obvious that this lever may be applied to cars the steering wheels of which are of different diameters. Since the construction hereinbefore set forth is capable of a considerable range of change and modification without in any manner departing from the spirit of my invention, I do not wish to be understood as limiting myself to such specific structure except as hereinafter claimed.

I claim:—

1. In combination with a steering wheel, a throttle control lever operating beneath the steering wheel and moving in a plane parallel to the steering wheel, comprising an inner section and an outer section connected together by a horizontal pivot, and means for yieldingly maintaining the outer section in adjusted positions upon said pivot.

2. In combination with a steering wheel, a throttle control lever operating beneath the steering wheel and moving in a plane parallel to the steering wheel, comprising an inner section and an outer section connected together by a horizontal pivot, and means for yieldingly maintaining the outer section in adjusted positions upon said pivot, the outer section of the lever being adjustable as to length.

3. An attachment for the throttle rods of vehicles having a steering wheel adjacent which the throttle rod operates, comprising a member having a socket adapted to receive the throttle rod at one end and one section of a horizontal hinge at the opposite end and a second member bearing the remaining portion of the hinge and having its end portion provided with an operating handle, and means at the hinge yieldingly engaging said second member to maintain the same in vertically adjusted positions.

4. An attachment for the throttle rods of vehicles having a steering wheel adjacent which the throttle rod operates, comprising a member having a socket adapted to receive the throttle rod at one end and one section of a horizontal hinge at the opposite end and a second member bearing the remaining portion of the hinge and having its end portion provided with an operating handle, and means at the hinge yieldingly engaging said second member to maintain the same in vertically adjusted positions, said second section being formed in two sections telescopically engaged.

In testimony whereof I hereunto affix my signature.

ERNEST P. HOOVER.